United States Patent Office.

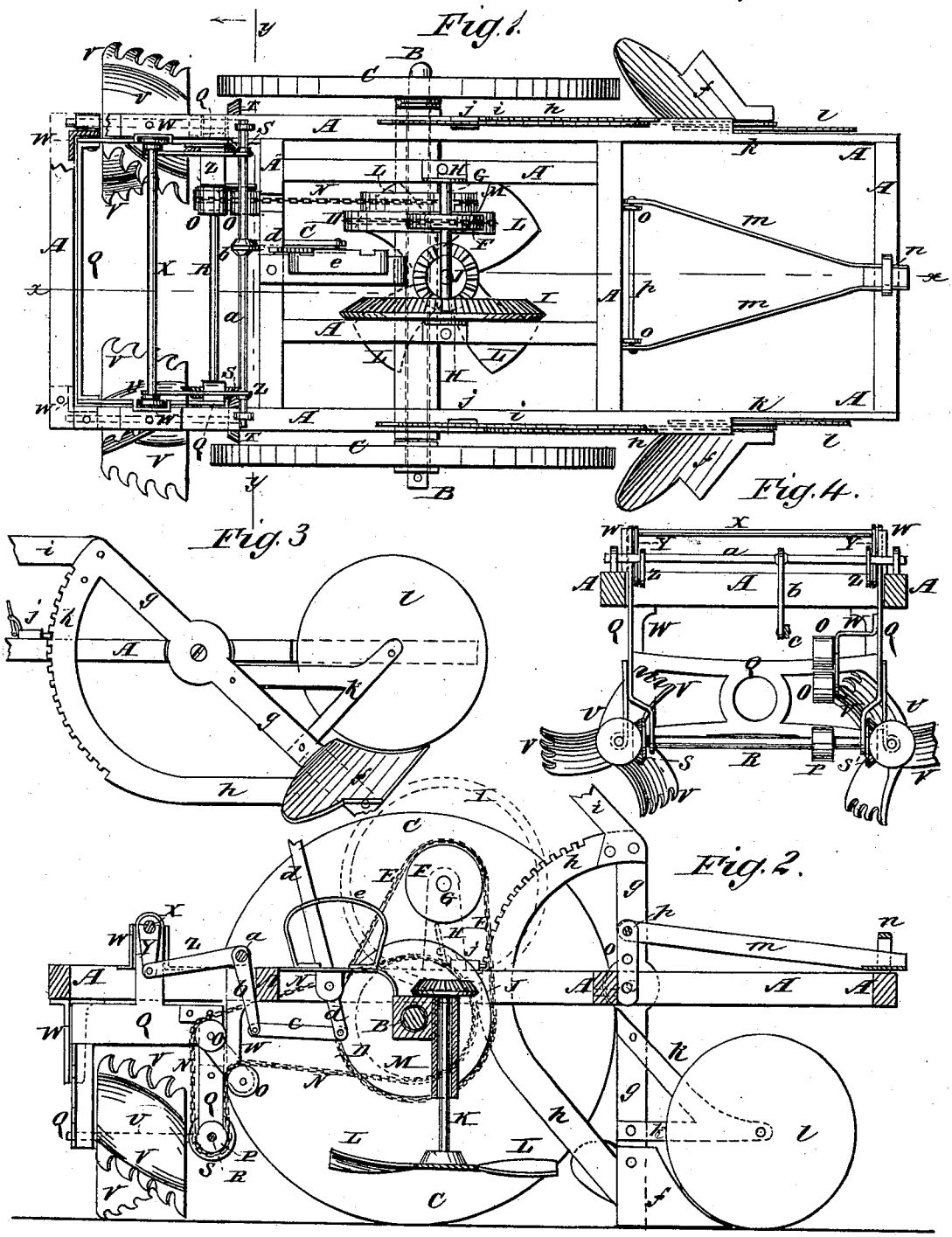

AUGUST W. BRENNER AND JAMES FRASER, OF COLEMAN, TEXAS.

CULTIVATOR.

SPECIFICATION forming part of Letters Patent No. 241,286, dated May 10, 1881.

Application filed October 13, 1880. (Model.)

*To all whom it may concern:*

Be it known that we, AUGUST WILLIAM BRENNER and JAMES FRASER, of Coleman city, in the county of Coleman and State of Texas, have invented a new and useful Improvement in Cultivators, of which the following is a specification.

Figure 1 is a plan view of the improvement. Fig. 2 is a sectional side elevation taken through the line $x\,x$, Fig. 1. Fig. 3 is a side elevation of the mechanism for raising and lowering the plows. Fig. 4 is a sectional end elevation taken through the line $y\,y$, Fig. 1.

The object of this invention is to furnish cultivators for cultivating stubble, sugar-cane, cotton, corn, and other plants planted in rows or drills, which will remove the soil from the sides of the rows without injuring the roots, and will throw soil around the plants, and which shall be simple in construction and convenient in use.

Similar letters of reference indicate corresponding parts.

A represents the frame of the cultivator, to the middle parts of the side bars of which are attached bearings for the axle B.

C are the wheels, one of which runs loose upon the axle B, and the other is rigidly attached to it, so that the said wheel will carry the said axle with it in its revolution.

To the axle B is rigidly attached a pulley, D, around which passes a belt or chain, E. The belt or chain E also passes around a smaller pulley, F, rigidly attached to a short shaft, G, which revolves in bearings in standards H, attached to the frame A. To the shaft G is also attached a large beveled-gear wheel, I, the teeth of which mesh into the teeth of a small beveled-gear wheel, J, attached to the upper end of a short vertical shaft, K. The shaft K revolves in bearings attached to the frame A of the machine or to the bearings of the axle B.

To the lower end of the shaft K are attached four, more or less, radial knives or cutters, L, which may be made in one piece or separate, and which are designed to top the cane-stubble, the arrangement of the driving mechanism giving such a rapid movement to the knives L that they will top the cane-stubble without splitting it, so that instead of replanting the cane every three years it will not need to be replanted oftener than once in six or eight years.

The gear-wheel J should be secured adjustably to the shaft K, so that the said shaft can be raised and lowered to adjust the cutters L at any desired distance from the ground.

To the axle B or to the pulley D is attached a pulley, M, around which passes a belt or chain, N. The belt or chain N also passes over guide-pulleys O and around a pulley, P. The guide-pulleys O are pivoted to supports attached to the frame Q, and the pulley P is attached to a shaft, R, which revolves in bearings in the lower forward corners of the said frame Q.

To the ends of the shaft R are attached small beveled-gear wheels S, the teeth of which mesh into the teeth of the small beveled-gear wheels T, attached to the forward journals of the cylinders U. The journals of the cylinders U revolve in bearings in the lower corners of the frame Q.

To the cylinders U are attached, or upon them are formed, toothed hoes V, which are arranged spirally. The cylinders U, between the hoes V, are concaved to allow the soil, grass, and weeds to escape freely.

The frame Q slides up and down in guides W, attached to the frame A, and has upwardly-projecting arms formed upon or attached to the centers of its end top bars.

The upper ends of the upwardly-projecting arms of the frame Q are connected by a rod, X, and to the upper parts of the said arms, or to the end parts of the rod X, are pivoted the upper ends of short swinging bars Y.

To the lower ends of the bars Y are pivoted the rear ends of the arms Z, the forward ends of which are rigidly attached to a shaft, $a$. The ends of the shaft $a$ work in bearings attached to the side bars of the frame A, and to the middle part of the said shaft is rigidly attached the upper end of a downwardly-projecting arm, $b$.

To the lower end of the arm $b$ is pivoted the rear end of a short connecting-bar, $c$, the forward end of which is pivoted to the lower end of the lever $d$. The lever $d$ is pivoted to a bar or other support attached to the frame A, and its upper end projects into such a position that it can be conveniently reached and operated by the driver from his seat to adjust the hoes V to work at any desired depth in the ground. With this construction, as the machine is drawn along the row the hoes V remove the grass, weeds, and soil from the roots of the plants along both sides of the row without injuring the roots of the plants. By exchanging the hoe-cylinders they may be used for throwing soil around the roots of the plants.

The lever $d$ is held in position when adjusted by entering one or another of the notches in the side of the arched bar $e$, the ends of which are attached to the bar that supports the lever $d$, or to the frame A.

$f$ are plows for barring off the rows, the standards $g$ of which are extended upward, and are pivoted at their middle parts to the side bars of the frame A in front of the wheels C. The standards $g$ are strengthened by the semicircular brace-bars $h$, the ends of which are attached to the said standards at points above and below and equally distant from their pivots, and the curved rear edges of which rest against shoulders formed upon the side bars of the frame A.

To the upper ends of the standards $g$ and braces $h$ are rigidly attached levers $i$, which project upward and rearward into such positions that they can be conveniently reached and operated by the driver from his seat to raise and lower the plows $f$.

The plows $f$ are held in any position into which they may be adjusted by catch-bolts $j$, attached to the side bars of the frame A, and which engage with notches in the edges of the brace-bars $h$, or by other suitable fastenings.

To the standards $g$ are rigidly attached brackets or arms $k$, which project forward and have circular colters $l$ pivoted to their forward ends to cut the soil, grass, and roots in front of the plows, and thus prevent the plants from being disturbed by the tearing away of the soil and roots.

$m$ represents the forked rear end of the tongue, which passes through a keeper, $n$, attached to the front end bar of the frame A. The ends of the branches of the tongue $m$ are pivoted to upright bars $o$, attached to the second cross-bar of the frame A by a rod or bolts, $p$. The upright bars $o$ have a number of holes formed through them to receive the pivoting rod or bolts $p$, so that the pitch of the tongue $m$ may be adjusted to cause the plows to work deeper or shallower in the ground, as circumstances may require.

Having thus fully described our invention, we claim as new and desire to secure by Letters Patent—

1. In a cultivator, the carriage A B C, the vertical shaft and radial knives K L, the longitudinally-revolving spiral hoes U V, the colters $l$, and the plows $f$, combined and arranged to be operated as and for the purpose specified.

2. In a cultivator, the combination, with the frame A, the drive-wheels C, and the axle B, of the pulleys and band M P N, the guide-pulleys O, the shaft R, the beveled-gear wheels S T, the frame Q, and the cylinders U, carrying the spiral-toothed hoes V, substantially as herein shown and described, whereby the soil, grass, and weeds can be removed from over the roots of the plants without injuring the said roots, as set forth.

3. In a cultivator, the combination, with the frame A of the carriage, and the frame Q, carrying the hoe-cylinders U V, of the guides W, the swinging arms Y, the shaft $a$, having rigid arms Z and $b$, the connecting-rod $c$, and the lever $d$, and catch-bar $e$, substantially as herein shown and described, whereby the hoe-cylinders U V can be adjusted and raised from the ground, as set forth.

4. In a cultivator, the combination, with the frame A of the carriage and the plows $f$, of the pivoted standards $g$, the semicircular braces $h$, the levers $i$, and catches $j$, substantially as herein shown and described, whereby the plows $f$ can be raised, lowered, and held in place, as set forth.

AUGUST WILLIAM BRENNER.
JAMES FRASER.

Witnesses:
W. C. PERRY,
W. O. READ.